Oct. 14, 1930.   H. E. VON GRIMMENSTEIN   1,778,613

STORAGE BATTERY

Filed June 14, 1928

INVENTOR,
Henry E. Von Grimmenstein,
By Minturn & Minturn,
Attorneys.

Patented Oct. 14, 1930

1,778,613

UNITED STATES PATENT OFFICE

HENRY E. von GRIMMENSTEIN, OF INDIANAPOLIS, INDIANA

STORAGE BATTERY

Application filed June 14, 1928. Serial No. 285,237.

This invention relates generally to a storage battery and in particular to a structure for positively holding in place the separators between the positive and negative plates of the battery and for the preventing of movement of the plates themselves.

The invention is described in one particular form as shown in the accompanying drawing, in which—

Figure 1:
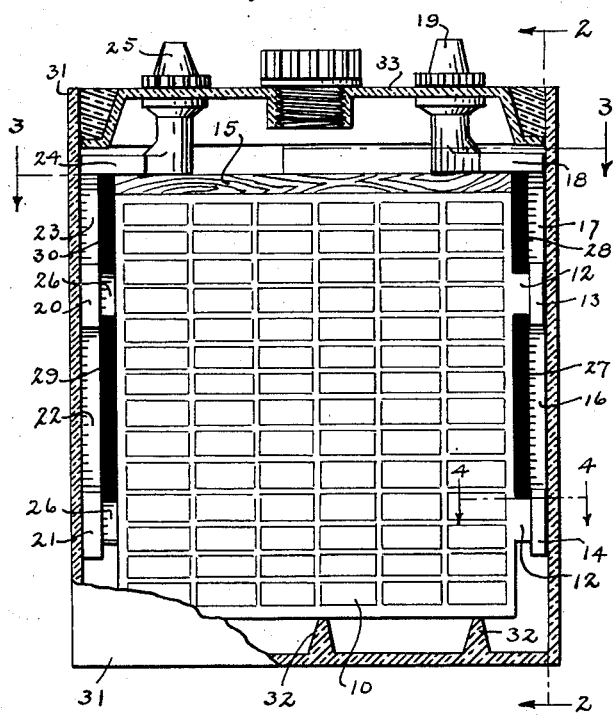
Figure 2:
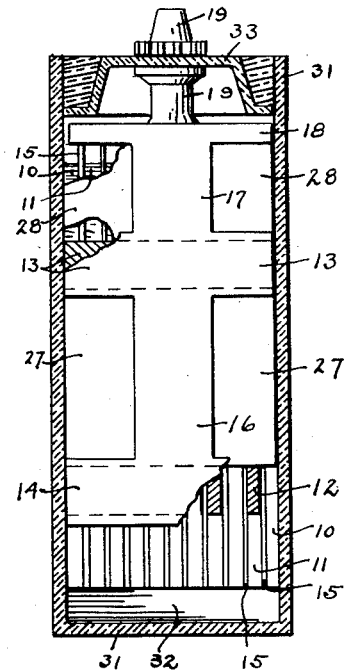
Figure 3:
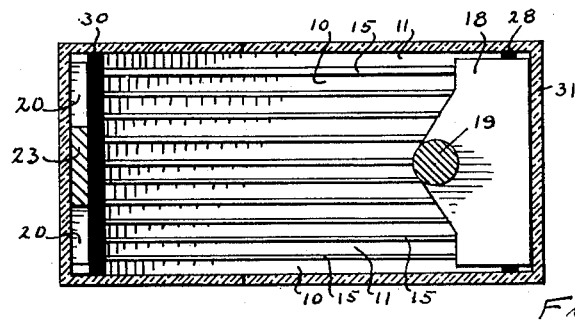

Fig. 1 is a side elevation of a storage battery cell with the side wall cut away embodying my invention;

Fig. 2, a vertical transverse section through the cell on the line 2—2 in Fig. 1;

Fig. 3, a horizontal transverse section on the line 3—3 in Fig. 1; and

Figure 4:
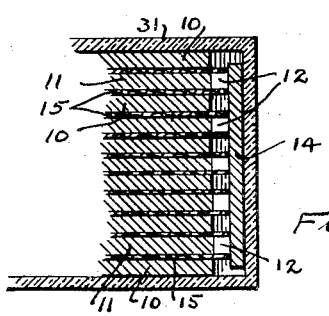

Fig. 4, a transverse horizontal section on the line 4—4 in Fig. 1.

Like characters of reference indicate like parts throughout the several views in the drawing.

The cell here shown is one of the eleven plate type, having six negative plates 10 and five positive plates 11. The negative plates 10 each have two lugs 12 spaced apart vertically and extended from the plate edge to be burned onto the transverse busbars 13 and 14, with sufficient space left between each pair of plates to permit the insertion therebetween of one positive plate 11 with a separator 15 on each side of the plate 11. The busbars 13 and 14 are tied together by the central vertically positioned strap 16, and a strap 17 extends upwardly from the busbar 13 to carry the horizontally disposed terminal plate 18 which projects inwardly over and slightly above the plates 11. A terminal post 19 extends upwardly from the inner end of the plate 18.

Similarly, the positive plates 11 are spaced apart and tied together through the projecting lugs 26 by the upper and lower busbars 20 and 21 with the interconnecting busbar strap 22 and the top strap 23 carrying the terminal plate 24 and terminal post 25.

The positive and negative plates 10 and 11 so assembled are fitted together, a positive plate 10 with a separator 15 on each side between each pair of negative plates 10. The separators 15 extend just to the two vertical sides and bottom of the plates, and project vertically upwardly from the tops of the plates to contact the under sides of the terminal plates 18 and 24.

The busbars 13, 14, and 20, 21 are wider than the height of the lugs 12 and 26. A block of insulating material 27, preferably hard rubber, is inserted between the strap 16 and the vertical edges of the plates 10 and 11 between the busbars 13 and 14, the block 27 being cut to slide snugly between the upper and lower lugs 12. A block 28 of hard rubber is also inserted between the strap 17 and the plates 10 and 11 to slide between the top lugs 12 and the plate 18. A block of hard rubber 29 is inserted on the opposite side between the strap 22 and plates 10 and 11 and between the top and bottom lugs 26, and the block 30 is pushed in between the top strap 23 and plates 10 and 11, between the top lugs 26 and terminal plate 24.

The plates, so assembled are then dropped into the jar 31 to rest on the ribs 32. The top cover 33 is positioned over the jar 31 to have the posts 19 and 25 extend therethrough and be locked in place.

By reason of the hard rubber blocks between the busbar straps and the straps being adjacent the walls of the jar, the plates 10 and 11 can not move one along the other to contact the opposite busbar, and neither can the separators move since they are contacted from all four sides. It is, therefore, to be seen that a very secure mounting of the plates and separators is secured, with the advantages of the two point side support of each plate through its connected busbars and straps, and of the prevention of accidental short circuits between the plates and busbars of opposite polarity as might happen under severe jolting over rough roads in automobile or similar usage of the battery.

I claim:

1. In a storage battery cell a set of positive plates, a set of negative plates, the plates of said sets being provided at opposite ends of the cell along their vertical edges with a plurality of vertically spaced lugs, upper and lower busbar members interconnecting said lugs on each end, and insulating members carried between said busbar members and the ends of said plates and between said lugs, a separator between each pair of plates, and terminal plates connecting with the busbars and contacting the separators.

2. In a storage battery cell a set of positive plates, a set of negative plates, the plates of said sets being provided at opposite ends of the cell along their vertical edges with a plurality of vertically spaced lugs, upper and lower busbar members interconnecting said lugs on each end, and insulating members carried between said busbar members and the ends of said plates and between said lugs, a separator between each pair of plates, said separators projecting above the tops of said plates, and terminal plates interconnected with said busbars spaced above said plates and contacting said separators.

3. In a storage battery cell, a plurality of plates spaced apart in vertical planes, an upper and a lower series of busbars horizontally interconnecting said plates by their outer edges, said plates being in two sets of opposite polarity, separators between the plates, and insulating means preventing the movement of the plates of one polarity toward the busbars of the plates of opposite polarity and terminal plates interconnected with the busbars and contacting the separators.

4. In a storage battery cell, a plurality of plates spaced apart in vertical planes, busbars horizontally interconnecting said plates by their outer edges, said plates being in two sets of opposite polarity, separators between the plates, and insulating means preventing the movement of the plates of one polarity toward the busbars of the plates of opposite polarity, and means preventing the movement of the separators over said plates, comprising a strap extending upwardly from the busbars and a terminal plate fixed to each strap and extending over the plates to rest on the separators.

5. In a storage battery cell, a plurality of plates, separators between the plates and projecting thereabove, said plates being in two sets of opposite polarity, upper and lower horizontal busbars on one end interconnecting the plates in one set, upper and lower horizontal busbars on the opposite ends of the plates interconnecting the plates in the other set, each of said upper and lower busbars being joined by a vertical strap, a strap extending upwardly from each of said upper busbars, a terminal plate fixed on the upper end of each of said top straps and horizontally disposed over said plates to rest on said separators, and insulating blocks inserted between said upper and lower busbars and said interconnecting strap and plate ends at each end of the plates.

In testimony whereof I affix my signature.

HENRY E. von GRIMMENSTEIN.